Figure 12:
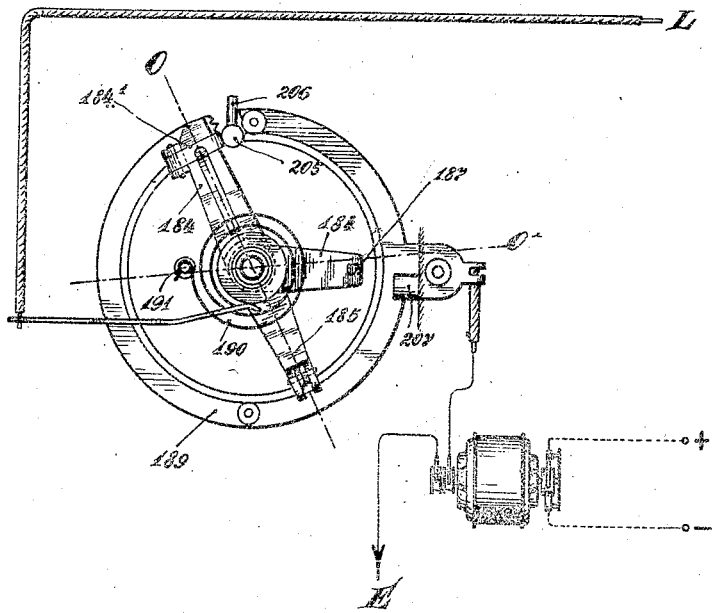

P. ETIENNE.
TELEGRAPHIC TYPE WRITING SYSTEM.
APPLICATION FILED AUG. 19, 1911.
1,176,824.
Patented Mar. 28, 1916.
8 SHEETS—SHEET 1.
Fig. 1.
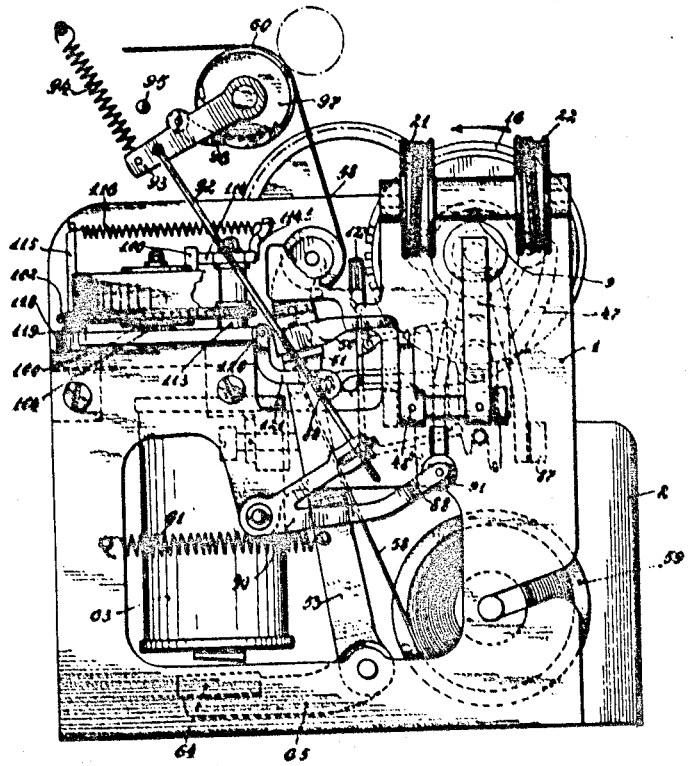
Fig. 5. Fig. 6. Fig. 3.
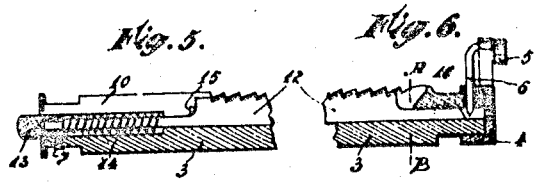 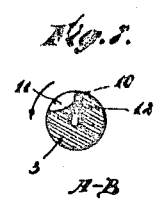
Fig. 4.
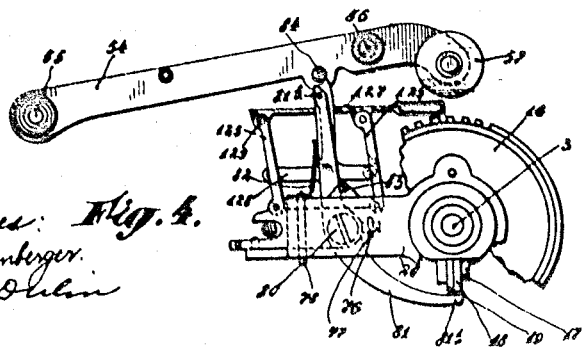
Witnesses:
V. C. Landenberger.
C. T. Dulin.
Inventor:
Paul Etienne
by B. Singer
Atty.

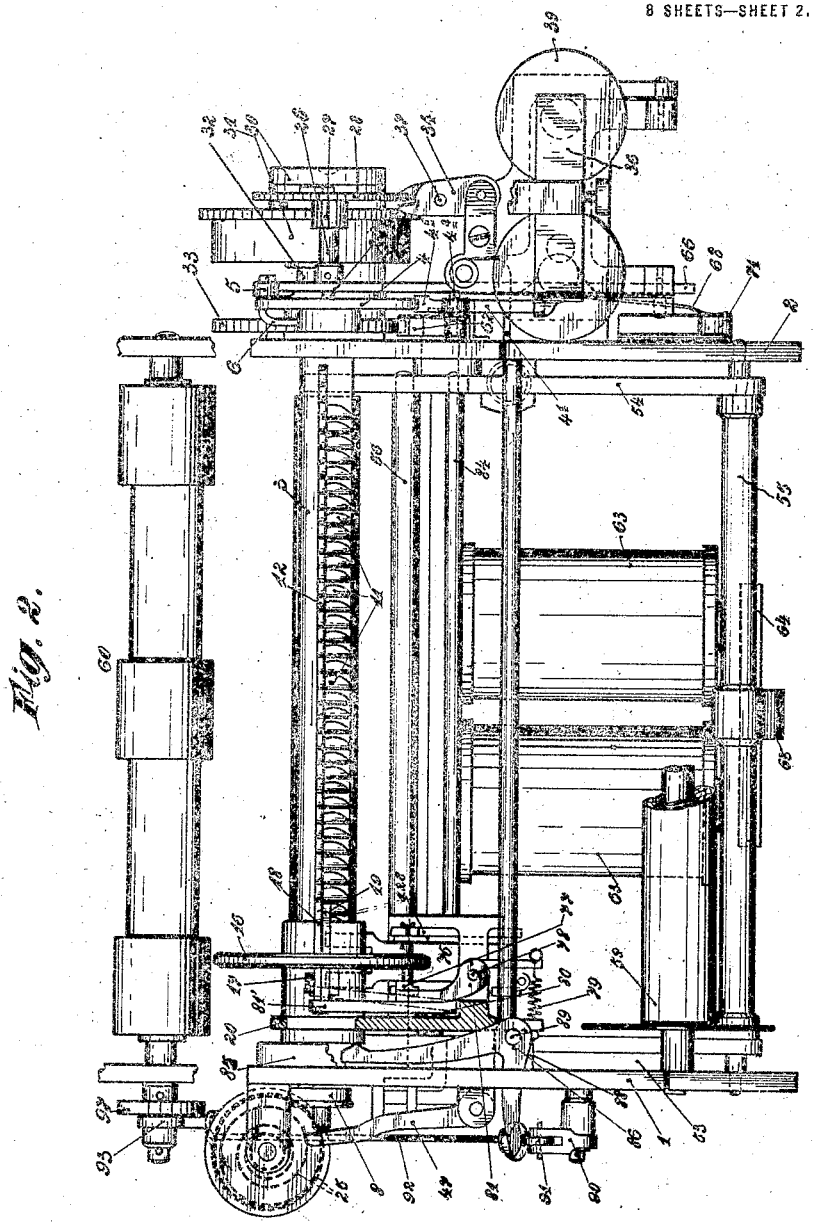

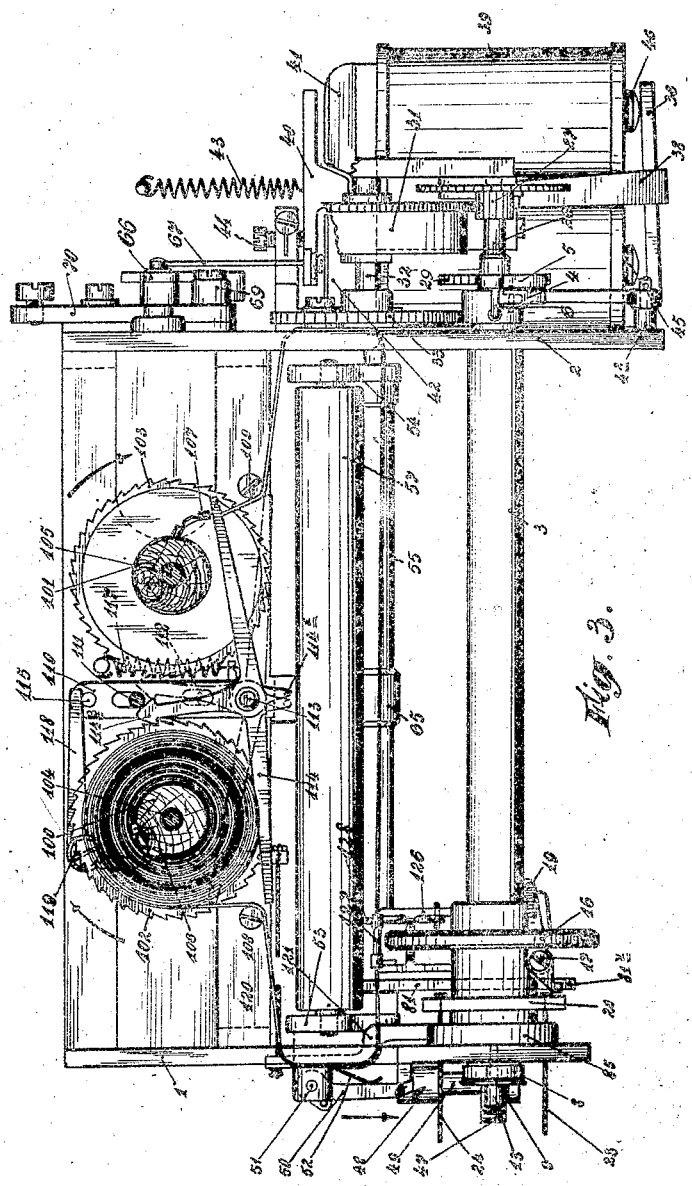

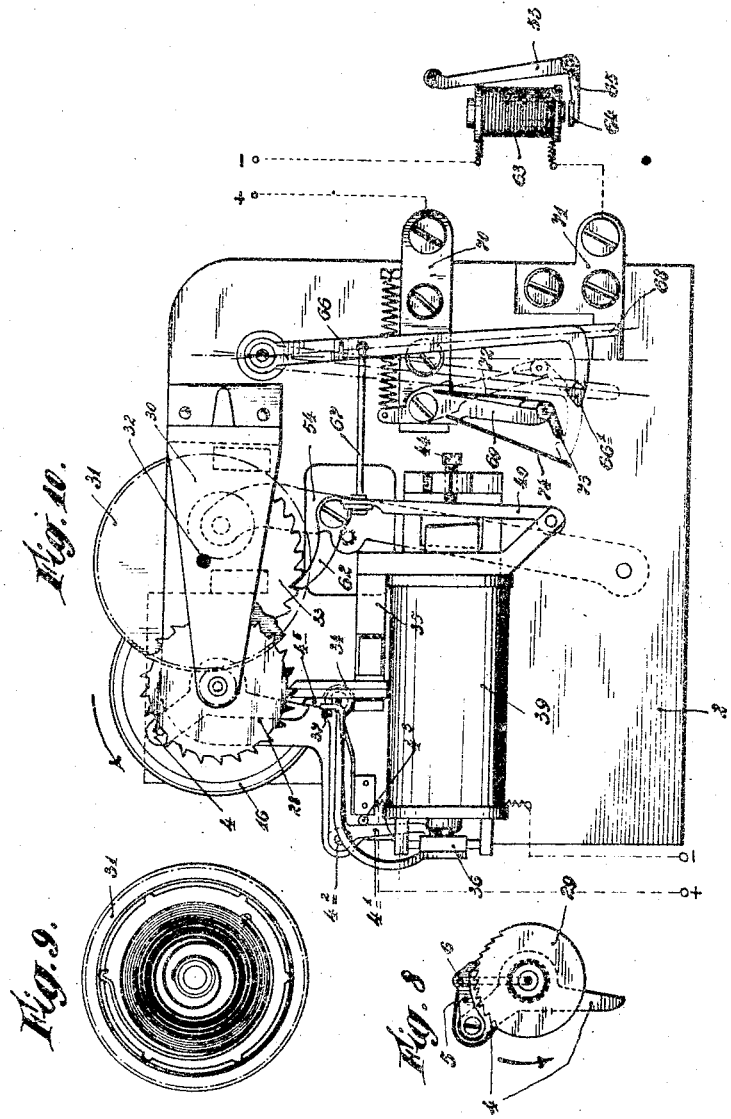

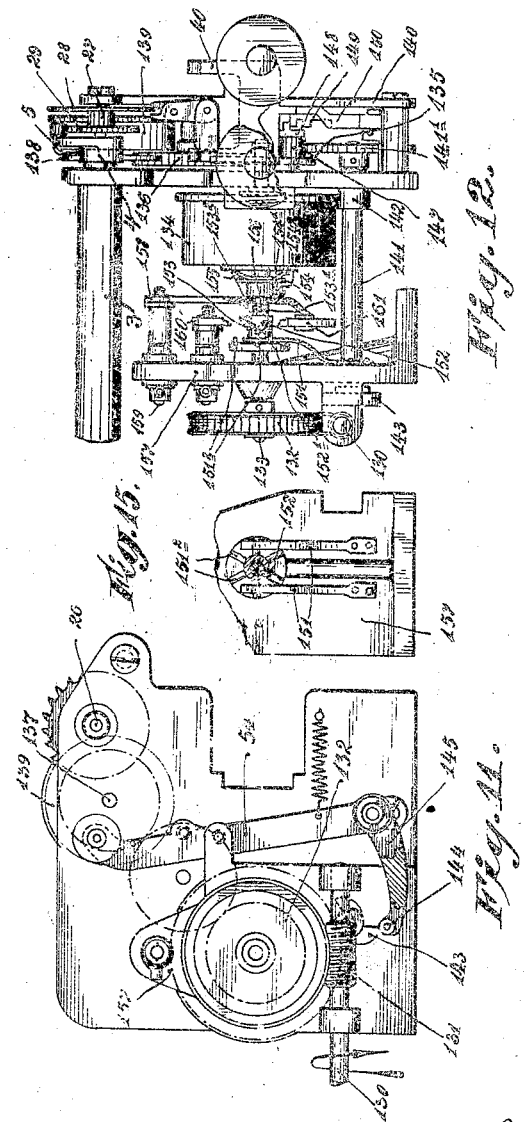

P. ETIENNE.
TELEGRAPHIC TYPE WRITING SYSTEM.
APPLICATION FILED AUG. 19, 1911.

1,176,824.

Patented Mar. 28, 1916.
8 SHEETS—SHEET 6.

Inventor:
Paul Etienne
by B. Singer
Atty

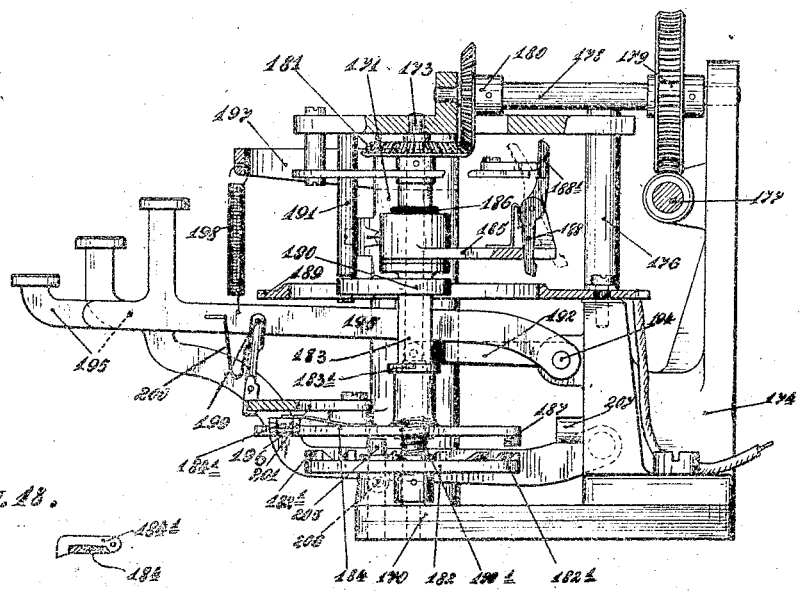
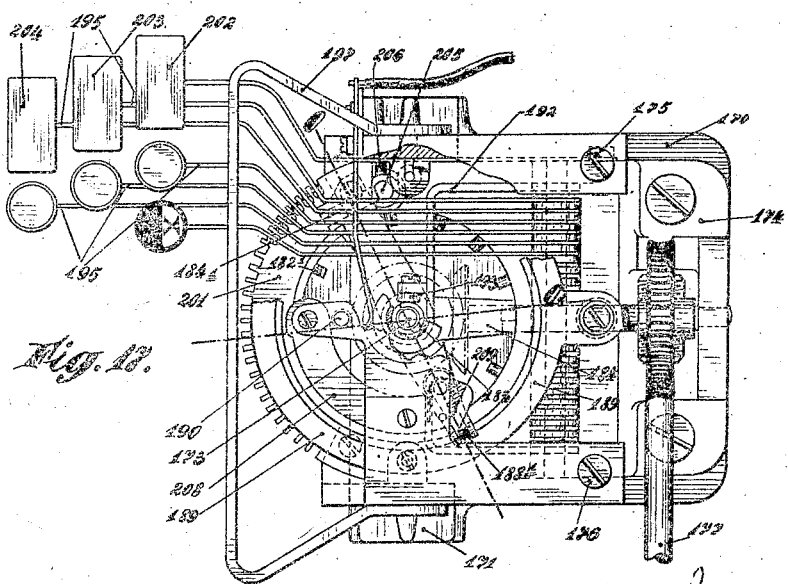

P. ETIENNE.
TELEGRAPHIC TYPE WRITING SYSTEM.
APPLICATION FILED AUG. 19, 1911.
1,176,824.
Patented Mar. 28, 1916.
8 SHEETS—SHEET 8.
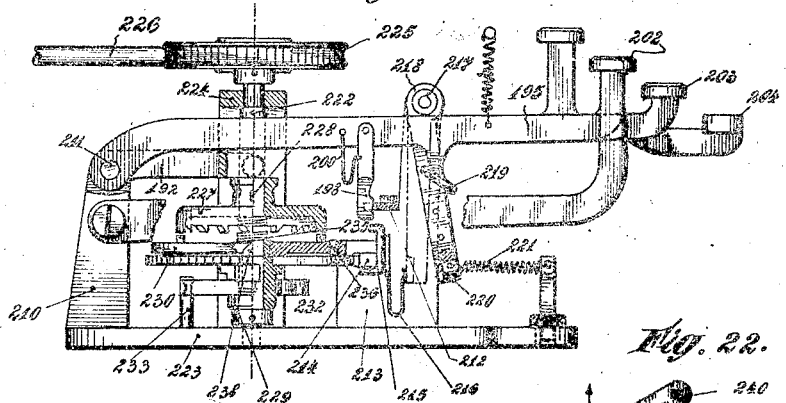
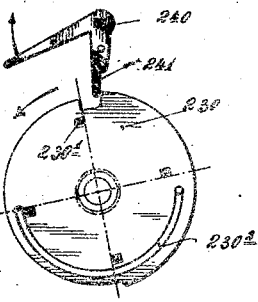
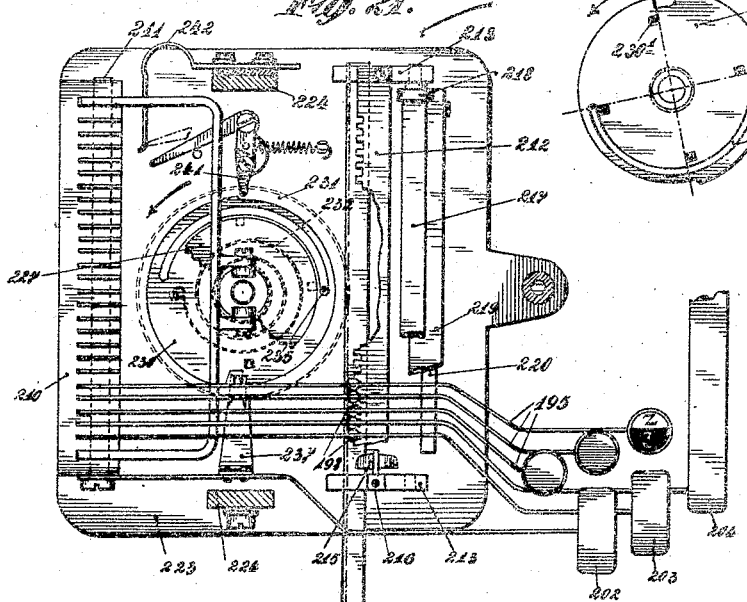
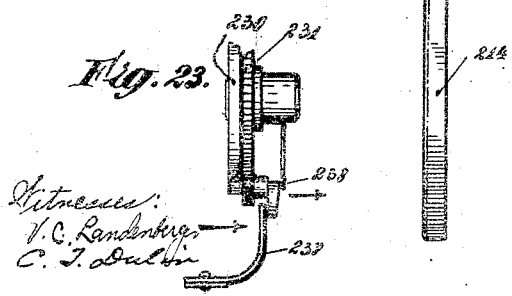

UNITED STATES PATENT OFFICE.

PAUL ETIENNE, OF ST. IMIER, SWITZERLAND, ASSIGNOR OF ONE-HALF TO BRUNO BURCHARDT, OF BERLIN, GERMANY, AND ONE-TENTH TO FRITZ ALDENDORFF, OF SCHMARGENDORF, GERMANY.

TELEGRAPHIC TYPE-WRITING SYSTEM.

1,176,824.  Specification of Letters Patent.  Patented Mar. 28, 1916.

Application filed August 19, 1911. Serial No. 644,955.

*To all whom it may concern:*

Be it known that I, PAUL ETIENNE, a citizen of Switzerland, residing at St. Imier, in Switzerland, have invented new and useful Improvements in Telegraphic Type-Writing Systems, of which the following is a specification.

My invention relates to page-printing telegraphic receivers and to suitable sending devices or impulse transmitters for transmitting signals or messages to the receivers, and comprises all the devices required for the electrical transmission and receiving of communications in writing. The system belongs in the class in which, by means of keys or similar devices, electric impulses are caused to move the types of receivers into their printing position, the particular type that is moved into its printing position being determined by the number of impulses sent.

An important feature of the system consists in the operations performed in the receivers, besides that of bringing the particular type that is to be printed into position, such as the act of printing, returning the parts to their normal positions, etc., taking place on the cessation of the current impulses by a member being released that is held fast while the series of impulses flows. In connection with this feature the whole arrangement of the system is peculiar and it is so constructed that it combines rapid and easy manipulation with simplicity of design. This system enables all the functions of the receiver to be performed with a single controlling magnet. In addition all practical requirements are provided for, devices being furnished to render the writing visible immediately after it has been printed, for automatically returning the type wheel to its normal position, for shifting the wheel on after a letter has been printed, for returning it to the end of the page for commencing a new line, for moving on the paper and the inking ribbon and for insuring reliable working.

The various features peculiar to the system will be most readily understood from the description of a form of the system illustrated in the drawings.

Figure 13:
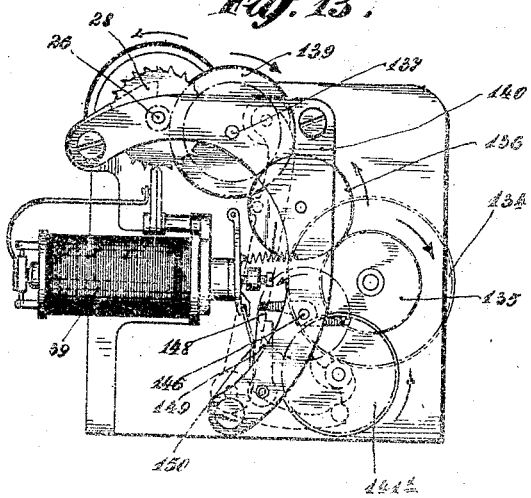
Figure 14:
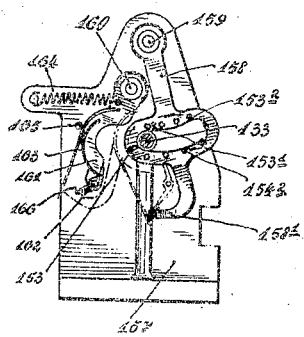

In said drawings Figure 1, is a side elevation of the receiver viewed from the left of Fig. 2, certain parts being broken away. Fig. 2, is a front elevation. Fig. 3, is a top plan view. Fig. 4, shows the platen shifting lever, the typewheel, the parts interposed between the said parts to restore the typewheel to its normal axial position, and the ribbon vibrator. Figs. 5 and 6, show the typewheel supporting shaft in longitudinal section so as to disclose certain parts used for shifting the typewheel axially and radially. Fig. 7 is a cross section of Figs. 5 and 6. Fig. 8 represents the pawl and ratchet arranged at the right end of the typewheel supporting shaft shown in Fig. 6 which pawl and ratchet serve to move the typewheel radially. Fig. 9 illustrates the spring box that supplies the power for driving the typewheel. Fig. 10 is an elevation of the receiver seen from the right of Fig. 2. Fig. 11 is a side view seen from the left of the spring motor for driving the moving parts of the receiver. Fig. 12 is a front view of said motor, and Fig. 13 is a side view thereof seen from the right. Fig. 14 shows a portion of an automatic switch for switching an electric motor coöperating with the spring motor into or out of circuit, said electric motor being omitted from the drawings. Fig. 15 represents another part of the automatic switch aforementioned. Fig. 16, is a right-hand side view of a transmitter which is suitable for use in connection with the receiver shown in Figs. 1 to 15. Fig. 17, is a top view of the transmitter. Fig. 18, is a detail view. Fig. 19, shows the principal member and the electrical connections of the transmitter. Figs. 20 to 23 illustrate a modified form of transmitter.

Pivotally mounted in the sides 1 and 2 of the frame of the receiver is the supporting shaft 3 of the typewheel 16. The shaft 3 carries an arm 4 to which a pawl 5 that engages with a ratchet wheel 29 (see Fig. 8) is pivotally fixed. The bent end of a rod 6 enters into a hole in the pawl 5 (see Fig. 6) so that by the motion of the rod the pawl can be lifted clear of the wheel 29. The left end of the shaft 3 is hitched by a hook 7 to one end of a spiral spring 8 the other end of which is fastened to a pin 9 on the frame. The spiral spring is wound up when the shaft is turned forward by the pawl 5 acting on the ratchet 29 and has the tendency to turn the shaft back when the pawl is lifted out of the ratchet teeth. Through the whole length of shaft 3 there is a central hole and a narrow radial slot 10 (Figs. 5 to 7). The shaft has also a number of transverse notches 11. In the slot 10 there is a rack 12 the ends of which are round and are inserted in the central hole of the shaft. A spring 14 which at its one end presses against a pin 13 fixed to the end of the rack 12 tends to shift the rack in the direction of its length, so that it will be returned to the normal position shown and determined by the stop 15 as soon as any power that has displaced it ceases to act. Pivotally fixed by a screw 17 to the hub of the typewheel 16 and adjacent to each other are the detents 18 and 19, the detent 18 engaging with the teeth of the rack 12 and the detent 19 being in engagement with the teeth 11 of the shaft 3. When the typewheel moves along its supporting shaft 3 a carriage 20 which rests in a groove in the hub of the typewheel slides along with it. Attached to the carriage 20 are the metal cords 23, 24 leading to two drums 21, 22 which are rigidly coupled to each other and are under the influence of a spiral spring 25. The latter tends to haul the carriage 20, and with this the typewheel, back into its initial longitudinal position whenever the typewheel is released from the transverse teeth of the shaft for the purpose of beginning the writing of a new line. The gear for turning the typewheel into the desired radial position consists of an escapement wheel 28, a ratchet 29 and a gear wheel 27 which latter engages with a cog wheel of a spring box 31.

26 is a shaft to which the wheels 27, 28 and 29 are rigidly fixed and this shaft is pivotally mounted in the angle piece 30 of the frame of the machine so as to be in an exact line with the supporting shaft 3 of the typewheel.

32 is a shaft pivotally mounted in the angle piece 30 and carries the spring box 31 and a ratchet wheel 33 which is used for winding up the clock spring in the spring box 31. The spring box 31 acting through its gear wheel upon the pinion 27 imparts to the escapement wheel 28 the tendency to turn in a certain direction. The motion of the escapement wheel 28 is regulated by the two-part escapement lever 34 pivoted on the angle piece 35 (Fig. 10). The escapement lever is coupled by a pin 37 and an arm 38 to the polarized armature 36 of an electromagnet 39 (Figs. 2 and 10). Current impulses coming from the transmitter, to which the receiver now being described is connected, flow through the windings of the electromagnet 39 and an impulse in the one direction will cause the armature 36 to be moved away from the one pole 45 and to be attracted to the other pole 46, while an impulse flowing in the other direction will cause the armature to oscillate in the other direction. By virtue of the pin 37 and the arm 38 the armature 36 causes the escapement to oscillate with it and on each oscillation of the lever 34 the escapement wheel 28 is moved forward by the spring box by half the distance between the centers of two adjacent teeth and this rotary motion is participated in by the ratchet wheel 29, which, by means of the pawl 5, also turns the typewheel.

In addition to the polarized armature 36 the electromagnet 39 has, at its other end, an armature 40 which is attracted by the pole pieces 41 and 42 whenever the electromagnet is excited by alternating current impulses. The electromagnet 39 is so arranged that the armature 36 is oscillated by each current impulse while the armature 40 remains attracted as long as the impulses continue to flow. As soon as the current impulses cease the armature 40 is drawn back into its normal position against the screw stop 44 by a spring 43. The armature 36 will have been pulled up against the pole 45 or 46 according as the last impulse was a negative or a positive impulse. For reasons set forth further on the armature 36 is at the end of each series of impulses, always caused by mechanical means to assume the position into which it is brought by a negative impulse even if the last impulse was a positive one, so that when it is at rest it is always ready to immediately respond to a positive impulse.

The release of the typewheel after the letter turned into the printing position has been printed and the moving on of the typewheel to position of the next letter is accomplished by moving the rack 12 by means of a lever 47 which rests against the head 13 of the rack 12. The lever 47 is rigidly coupled with the arm 48 by the shaft 49 which is pivotally mounted in the frame of the machine. The printing lever 53 is caused to move forward when the current impulses cease, in the manner explained below, and in falling back into its normal position it causes the arm 48 to be oscillated by an arm 50 which is pivotally attached to the upper end of the lever 53 and is held in its normal position by a spring 52. On the lever 53 moving forward the arm 50 moves past a small triangular protuberance $48^1$ on the top of the arm 48 but when this lever moves back the arm brushes against the protuberance causing the arm 48 to be moved aside (see Figs. 1 and 3).

In the machine being described when a letter is to be printed a platen is advanced toward the typewheel. 57 is the platen and the platen advancer consists of the levers 53 and 54 which carry the platen and are rigidly connected to each other by the shaft 55 and the bar 56. The bar 56 helps to guide the paper band 58 which is drawn from the drum 59 in the lower part of the machine and passes out over the paper shifting roller 60. Attached to lever 54 of the platen advancer is a pawl 62 (Figs. 2 and 10) which engages with the teeth of the ratchet wheel 33 stepping it forward each time the platen 57 is advanced and thus winding up the spring of the spring box 31. The platen advancer is actuated by a local source of power through the medium of an armature 40 which is caused to move in the manner described below at the end of each series of current impulses.

The working of the parts described thus far is as follows: When the escapement lever 34 is oscillated by the armature 36 the escapement wheel 28 is allowed to turn and in so doing the pawl 5 on the arm 4 rotates, carrying the ratchet wheel 29 and the supporting shaft of the typewheel 16 around with it, the typewheel 16 being thus also caused to rotate, it being coupled to the shaft by the detent 19 lying in the slot 10. After the typewheel has been thus rotated into the required position the platen advancing levers 53 and 54 are swung forward in the manner described below in consequence of the cessation of the current impulses that control the rotary motion of the typewheel. When the platen advancing levers are drawn back into their normal position by the spring 61, the arm 48 and with this arm the lever 47 is made to oscillate toward the right and this oscillation is imparted by the lever 47 to the rack 12, the length of the oscillation being the distance between two letters on the printed page. During its oscillation to the right the rack 12 pulls the typewheel along with it by means of the pawl 18. When the rack 12 is returned to the left to its normal position the typewheel is held in its advanced position by the detent 19 which grips the next tooth of the supporting shaft. In oscillating to the right the right hand end of the rack 12 brushed against the slanting end of the rod 6 (Fig. 6) and caused this rod to slide outward so that the pawl 5 was for a moment lifted clear of the ratchet 29 enabling the spiral spring 8 to turn the supporting shaft 3 with the typewheel 16 into its normal rotary position.

Beneath the pawl carrying arm 4 is a bell crank $4^1$ which turns on a pivot $4^2$ (Figs. 2, 3 and 10). When in its normal position the lower arm of the bell crank $4^1$ is held against a stop $4^3$ by a spring. Attached to the end of the other arm of the bell crank is a finger $4^5$ which lies in the path of a downwardly-pointing extension of the pawl carrying arm 4. When the arm 4, in rotating the typewheel into the writing position, turns in the direction indicated by the arrow in Figs. 8 and 10, the downward extension of the arm 4 pushes the finger down without moving the bell crank $4^1$. But when the arm 4 with its pawl 6 lifted clear of the ratchet 29 turns back into its normal position, the downward extension in brushing past the finger $4^5$ causes the bell crank $4^1$ to be deflected so that its downwardly pointing arm moves the polarized armature 36 away from the pole 45 of the electromagnet and causes it to lie against the pole 46 if it should not already have been in this position. The purpose of this contrivance is to always put the armature 36 in the position in which it is ready to respond to a positive current impulse.

The source of power for moving the platen advancer, (the existence of which has so far been merely assumed in describing Figs. 1 to 10) and the devices belonging to the same consist chiefly of the electromagnet 63 which receives its current from any suitable current source. The armature 64 of this electromagnet is attached to an arm 65 that is rigidly fixed to the axis 55 of the levers 53 and 54 of the platen advancer. The current for the electromagnet 63 is switched on by an automatically controlled switch which is actuated by the armature 40. This switch is most clearly shown in Fig. 10 and consists chiefly of a pivoted hook-shaped arm 66 which is mechanically but not electrically connected to the armature 40 and is furnished with a contact spring 68. Other parts of the switch are a snapping arm 69, which is insulated from the machine frame by a bar 70, and an insulated contact block 71. The block 71 is connected to the one end of the winding of the platen advancer magnet 63 and the bar 70 is connected to a source of current. When the armature 40 is attracted through current flowing over the line and through the magnet 39, the arm 66 is pulled to the left (Fig. 10) into the position indicated by dotted lines where it is held by a small double armed detent 73 that is pressed downward by a spring 72. While it is in this position the arm 66 establishes an electrical connection with the contact spring 74 but it does not close the local circuit of magnet 63 because the spring 68 and the block 71 are out of contact. When the armature, on the cessation of the current impulses flowing through magnet 39 is released, it falls back against the adjustable stop 44 moving the arm 66 toward the right. During this movement the hook of arm 66 takes the lever 69 along with it until the detent 73 slips out of the hook 66¹ and the lever 69 flies back into its normal position. Before the lever 69 detaches itself from the arm 66 the spring 68 slides onto the block 71. The subsequent sudden detachment of the lever 69 causes the local circuit to be instantaneously interrupted without sparking at the point of rupture.

The device that is caused by certain manipulations of the transmitter to return the typewheel of the receiver from any position into its normal axial position for commencing a new line is shown in Figs. 2 and 4. On its one side the typewheel has a rectangular projection 76 which, as long as the typewheel is in its normal position, presses a finger 77 to the left. This finger is pivoted on a pin 78 in the carriage 20 and a spring 79 turns the finger in a clockwise direction Fig. 2 whenever the rectangular projection 76 is moved away from it. Pivoted on the finger 77 by a screw pivot 88 is a two armed lever 81 which in its normal position, is pressed against a stop 83 by a spring 82. The size of the rectangular projection 76 is such that the device for returning the typewheel to the left end of the page acts whenever a small number of impulses only e. g. one or two, are sent through the controlling magnet 39. This causes an angular or rotary displacement of the typewheel so small in extent that the projection 76 does not leave the finger 77 so that the two-armed lever 81 remains in a perpendicular position i. e. at right angles to the typewheel supporting shaft 3. In this position the one end 81¹ of the two-armed lever is in line with outwardly directed rear extensions of the detents 18 and 19 and will press against these detents if the lever 81 turns on its pivot 80. This it is caused to do whenever the platen advancer is operated at the end of a series of line current impulses. The cross bar 84 then brushes up against the end 81² of the lever 81 and turns this lever on its pivot 80 causing the other end 81¹ to push the rear extensions of the detents 18 and 19 inward, so that their other ends release their hold of the teeth of the rack 12 and of the supporting shaft 3. The spring 25 will then by means of the cords 23, pull the typewheel to the left until its hub strikes against the ring 85.

Some of the force expended by the typewheel in flying back into its left hand position is utilized for moving on the paper sheet or page to the next line. This is done by the hub of the typewheel striking the top end of the bell crank lever 86 which juts into a slot in the ring 85 that takes the blow dealt by the typewheel. The bell crank lever 86 is pivoted on a pin 89 held by supports 87 and 88. The shorter arm of the bell crank lever rests upon the one arm of the V-shaped lever 90. The other arm of the lever 90 is connected by a rod 92 with a pawl carrying lever 93.

94 is a spring that tends to pull the lever 93 against a stop 95. Pivoted on the lever 93 is a pawl 96 that engages a ratchet wheel 97 which is fixed on a shaft carrying a paper roller 60. When the typewheel is moved out of its left end position to the right it is followed a short distance by the lever 86 by virtue of the spring 94 pulling the arms 90 and 93 upward. The pawl 96 then slips into another tooth. The stroke subsequently dealt by the typewheel on the upright end of the bell crank lever 86 pulls the lever 93 down and turns the roller 60 on one step.

The drums 100 and 101 (Figs. 1 to 3) are for the alternate winding on and paying out of an inking ribbon. When the one drum has paid out the whole of the ribbon the direction of rotation of the drums is automatically reversed so as to cause the inking ribbon to travel in the opposite direction. The drums are each rotated by a ratchet wheel 102 and 103 which turn upon pivots 104 and 105. The ends of the ribbon are fastened to the drums in a known manner and are furnished, at a distance from the ends of about one turn of the drum, with spring clasps 106 and 107 which grip the ribbon securely. The inking ribbon passes from the drum 100 over the guide roller 108, through slits in the frame of the machine, over the guide roller 109 onto the second drum 101.

110 is a sliding bar which moves at right angles to the supporting shaft 3. It is guided by the screws 111, 112, and carries a three-armed lever 114 on a pivot 113 and a pin 115. At the lower end of the arm which lies between the two drums the three-armed lever 114 has an upwardly-pointing extension 114¹ (Fig. 1) to which a spring 116 is attached. This spring tilts the lever 114 over to the left or to the right and holds it there as soon as this lever has been brought beyond the dead center.

117 is a spring that tends to pull the sliding bar 110 into the position shown.

118 is a bell crank lever which turns on a screw pivot 119 and is connected by a rod or cord 120 with an extension 121 of the lever 86. Each time the typewheel is returned to its left end position and moves the lever 86 the lever 118 is turned in a direction which causes the sliding bar 110 to be pushed forward. The end of the middle arm 114² of the three-armed lever is formed at its right and left sides into a pawl and according as the lever is tilted over to the left or right the pawl shaped end 114² engages with the ratchet 102, as represented in Fig. 3 or with the ratchet 103 as indicated in the same figure by dotted lines. On the sliding bar 110 being pressed forward the particular ratchet wheel with which the pawl 114² is engaging at that moment is stepped around causing the ribbon to be paid out from the one drum onto the other. When the one drum is nearly empty the clasp 107 leaves the periphery of the drum as shown at the right of Fig. 3 and strikes the end of the lever 114 moving it over until the middle arm 114² is tilted over against the other ratchet 103 by the action of the spring 116 so that the succeeding movements of the lever 118 will cause the ribbon to be wound onto the drum 101.

Although the ribbon shifting mechanism is represented as shifting the ribbon only at the commencement of each new line, I wish it to be understood, that my invention is not limited to this feature.

To make the writing visible immediately after each letter is written the inking ribbon is removed from the line being written after each movement of the platen advancer.
For this purpose a light structure in the shape of a parallelogram, consisting of two levers 125 and 126, a ribbon guide 127, an angular lever 128 and the necessary pins 129, is attached to the carriage 20. The inking ribbon passes through an eye at the end of the ribbon guide so that it can be lifted and lowered by the guide. In the normal position of the parallelogram the ribbon is held clear of the line being written. But as soon as the platen advancer is moved, the cross bar 84 strikes against the lever 128 and causes the ribbon guide to move up (to the right in Fig. 4) and insert the inking ribbon between the paper sheet and the type being printed. When the platen advancer falls back, the ribbon guide 126 drops down again of its own weight, thus rendering the writing visible immediately after it is written.
In Figs. 11 to 15 a power storing device or driving mechanism is shown which may be used if the power for driving the receiver is derived from a small motor. All the parts of the receiver not connected with the driving mechanism may remain as described above. The arrangement of the driving mechanism is as follows: 130 is a worm shaft coupled to a motor that is not shown on the drawing. The rotation of the shaft 130 is transferred by the worm gear 132 to the shaft 133 which carries a spring box 134 which latter, from time to time stores up power delivered by the motor and gives out this power at the proper moments to the mechanism that need to be propelled. The shaft 133 also carries a fixed gear wheel which is geared through an idler wheel 136, to another gear wheel 138 mounted on a shaft 137. The shaft 137 carries a spring box 139 which corresponds to the spring box 31 in Fig. 9. The spring box 139 imparts rotary motion to the shaft 26 through a pinion 27. Most of the shafts of the gear wheels aforementioned are journaled in the plate 140. The spring box 134 turns the gear wheel 142 which is fixed on the shaft 141. Also fixed on this shaft is a cam wheel 143 which acts upon the end of an arm 145 through a roller 144. A cog wheel 141¹ fixed on the end of the shaft 141 turns, by means of an intermediate gear not shown in the drawing, a gear wheel 147 on a shaft 146 which carries two-armed rotary escapement 148. In the circular path of the latter there is a detent 149 which is linked by a member 150 to the armature 40 of the electromagnet 39. When the armature 40 is attracted and moves the detent 149 to the left, (Fig. 13) the bent end of the rotary escapement moves from the upper surface of the detent 149 and, after a very short counter-clockwise rotary movement, strikes a ledge at the upper end of the detent by which its motion is stopped. On the subsequent retraction of the armature 40 the bent end of the rotary escapement slips off the ledge and passes down on the left side of the same (Fig. 13) and the rotary escapement now continues to revolve until the bent end of its other arm strikes the upper surface of the detent.

By preference the driving mechanism is so arranged that the electromotor need only run from time to time, i. e. whenever the spring boxes have given out a certain amount of the power stored up in them, and it is switched off as soon as it has sufficiently wound up the spring boxes. The switching on and off of the motor is accomplished automatically by the motion of the spring box 134 or of the shaft 133. The spring box 134 in turning carries a sleeve 154 which is loosely mounted upon the shaft 133 along with it. This sleeve has the form of a flange at its right end and the spring box 134 has a spring member 155 fixed to it which presses against the flange. The sleeve 154 is prevented from slipping toward the left on the shaft 133 by a fixed collar 156. The spring member 155 pressing against the flange of the sleeve 154 forms a frictional coupling between the sleeve 154 and the spring box 134. The sleeve 154 has a tooth 154¹ which engages with pins or teeth 154² of a switch arm 158 this arm being capable of swinging on an insulated pivot 159. In order to prevent the switch arm 158 from being swung out of any position by gravity, it is so arranged that to move it from any position into any other position a certain amount of resistance has to be overcome, this resistance being set up for instance by a spring washer with a square hole fitting on a square portion of the pivot 159, the spring washer having small projections on its one side which snap into small recesses on the hub of the arm 158. In addition to the cogs 154² the switch arm 158 has another set of cogs 153² on the upper side of the shaft 133 and on the side of the switch arm opposite to the cogs 154². A tooth 153¹ on a loose sleeve 153 with an oblique slot 152¹ meshes with the cogs 153². Protruding into the slot 152¹ is a pin 152 which is fixed in the shaft 133.

151 are springs which push the loose sleeve 153 toward the left into the position shown so as to normally keep the tooth 153¹ clear of the cogs 153². On their one side the springs 151 have projections 151¹ which enter into recesses 151² in the flange-shaped end of the sleeve 153 and tend to prevent the sleeve from turning. The upright 157 supports, in addition to the switch arm 158 with hook-shaped end 158¹, an arm 161 pivoted on and insulated from the pin 160. Pivoted on the end of the arm 161 is a small two-armed catch 162 which is normally pressed downward by a spring 163. In its normal position the arm 161, which is furnished with a contact spring 166, is drawn up against the stop 165 by the spring 164. The arms 161 and 158 are connected by wires to the source of current supply and to the motor that furnishes the power for driving the receiver.

The working of the driving mechanism just described is as follows: When the receiver, in printing a message, is set in motion by the spring box 134 this box turns in the direction indicated by the arrow in Fig. 13. The shaft 133 remains stationary but the sleeve 154 is carried around by the spring box and by means of its tooth 154¹, which meshes with the cogs 154², it moves the switch arm 158 toward the arm 161. When the arm 158 reaches the arm 161 its hook takes hold of the catch 162 and the circuit including the source of current supply and the motor coupled to the shaft 130 is closed and the motor starts running. The shaft 133 is then turned in the direction in which the spring box 134 previously rotated and while thus rotating the pin 152 pressing against the upper edge of the slanting slot 152¹ urges the sleeve 153 toward the right thus causing the tooth 153¹ to mesh with the cogs 153² and moving the switch arm 158 toward the right (Fig. 14). In its movement the arm 158 takes the arm 161 a certain distance along with it in the manner described for the switch arm 66 (Fig. 10) when the hook 158¹ slips off and flies away from the member 162¹ and thus effects a sparkless rupture of the circuit. The motor will then stop running and the turning of the shaft 133 will cease. The pin 152 will also cease to urge the sleeve 153 toward the right and the springs 151, the projections 151¹ of which will now be pressing against flat parts of the flange portion of the sleeve 153, will cause this sleeve to move spirally toward left, the tooth 153¹ being thus moved out of engagement with the cogs 153², so that this tooth will not prevent a renewed forward movement of the arm 158 by the sleeve 154 when it is turned by the spring box 134.

173 is a vertical shaft journaled in a base plate 170 and in an angular piece 171 screwed fast to the base plate.

175 and 176 are two columns which connect the supporting trestle 174 with the angular frame 171. A rotary converter or generator not shown in the drawing and giving out alternating current is coupled to the worm shaft 177 which, by means of the worm wheel 179, the shaft 178 and the miter gear wheels 180, 181 transfers its rotary motion to the upright shaft 173. Rigidly fixed to the upright shaft is a coupling disk 182 which has a number of teeth 182¹. Loosely mounted on the upright shaft is a sleeve 183 with two arms 184 and a contact arm 185. The contact arm is insulated from the shaft by a sleeve of hard rubber 186. The shorter one of the two arms 184 has a tooth 187 while the other arm carries a hinged piece 184¹ the bottom end portion of which has a slanting surface. The hub of the insulated contact arm 185 serves a current collector taking the current from a brush wiping on its periphery. The contact arm 185 carries a swinging contact brush 188 which on being swung out of the position in which it is represented in Fig. 16 makes contact with the inner surface of the insulated ring 189 fixed to the supporting trestle 174 and to the frame 171. The whole sleeve 183 is held in its normal rotary position by a clock spring 190 attached to the pin 191, the normal vertical position being secured by a spring 190¹.

192 is a bow pivoted at its ends on the horizontal axis 194 and rests with its two small steel rollers 193 on a round ledge 183¹ of the sleeve 183. Arranged above the bow 192 and also pivoted on the axis 194 are a number of key levers 195. Each of these keys is held in its normal upper position by a spring 196 attached to a supporting bar 197 and each key has attached to it a latch 198 pivoted on a pin 199 and urged inward against a holding ring 201 by a spring 200.

On a lever 195 being depressed the bow 192 is also pressed down it in turn depressing the sleeve 183 with the arm 184 and the contact arm 185. This causes the tooth 187 of the arm 184 to be caught by one of the teeth of the constantly rotating coupling disk 182 which then carries the arm 184 around with it until it strikes the latch 198. This latch which was forced inward and hooked the key fast to the ring 201 when it was depressed is then pushed outward so that the key is liberated and the sleeve 183 allowed to rise into its normal position. When the key rises the arm 184 is uncoupled from the disk 182 and is turned back into its normal position by the spring 190. While the arm 184 was coupled to the disk 182 the contact arm 185 was making contact with the ring 189 and current was sent over the line during an interval corresponding to the angle through which the arm 184 was turned. As the catches 198 are distributed at equal distances from each other around the circumference of the holding ring 201 the size of the angle through which the arm 184 is turned and the number of alternations of current sent over the line is determined by the key depressed.

The keys with rectangular finger plates shown in Fig. 17 are intended for three functions. The key 202 is the key for changing over from the one sign shown on any key to the other sign. Key 203 is the line space key or the key that is depressed when it is desired to commence a new line. Key 204 is the letter space key or the key used for leaving an unwritten space between two words. In the description of the receiver it was said that, on a certain small number of alternations being sent through the receiver, the typewheel is caused to fly into its normal position at the left hand end of its supporting shaft and the paper strip is simultaneously shifted on to the next line of writing. This certain small number of impulses is produced by the key 203 and when this number of impulses flows through the receiver no sign is printed, their only effect being to turn the typewheel through so small an angle that the cam 77 remains upon the rectangular projection 76 (Fig. 4) and to cause the typewheel to return to its normal left hand position. The word space key 204 produces a number of alternations which corresponds to a free space on the typewheel the preferred arrangement being to make this key send one more alternation than the line space key 203, the catch 198 of the word space key being one division farther along the circumference of the holding ring 201. By depressing the sign changing key 202 the arm 184 is caused to turn back (i. e. clockwise in Fig. 17) into a different starting position so that, when a key is depressed after the depression of the sign changing key, the arm 184 is made to turn through a greater angle than it would if it were depressed without the previous depression of the sign changing key, the path described by the arm 184 being always increased through depressing the sign changing key to the same extent, this amounting to the distance from the normal starting point back to the fixed special starting point. By the arm 184 being made to turn through a certain additional angle, a determined additional number of alternations are sent out by the transmitter, which cause a different part of the typewheel to be turned into the printing position. To bring about the described increased angular movement and the consequential additional impulses, the stop 205 at the normal starting position of the arm 194 is made depressible so that, on the sign changing key 202 being pressed down the pin 206 causes the stop 205 to sink into the base plate 170. The hinged piece 184¹, on the arm 184 will then no longer press against the stop 205 and the arm 184 will be swung around by the action of the spring 190 until it strikes against the fixed stop 207 (Figs. 16 and 19). If an ordinary key e. g. the key $\frac{x}{z}$ be now depressed the arm 184 will commence moving from the special starting point $O_1$ instead of from the usual point O (Figs. 17 and 19). The number of alternations sent over the line will consequently be increased by the number which corresponds to the angular distance from O to $O_1$ so that the typewheel of the receiving instrument will present the type z for impression instead of the type x.

Provision must be made for closing and opening the circuit precisely at the moment the arm 184 begins to turn or is stopped respectively, as otherwise an incorrect number of alternations could be sent out. This would happen for instance if contact were made shortly before the teeth 182¹ commenced taking the tooth 187 around. It is also important to break the circuit suddenly to prevent injurious sparking. To this end the contact brush is furnished with a tail 188¹ which when in its normal position, rests against the arm 209 pivoted to the segment 208 and keeps the contact brush a certain distance away from the contact ring whenever the sleeve 183 is being depressed. But as soon as the disk 182 carries the arm 184 around with it the tail 188¹ leaves the arm 209 and the contact brush 188 is tilted over and brushed against the inner circumference of the contact ring 189 until the arm 184 is uncoupled again. By this contrivance not only exactitude in number of alternations sent is insured but it also constitutes a means of closing the sending circuit before the maximum current strength in the first alternation is reached, which is very desirable when one transmitter operates large numbers of receivers. The contact brush 188 is returned into its normal vertical position by brushing against the segment 208 which is adequately sloped to perform this function.

In case the sign changing key is used that is, when the arm 184 is rotated in a backward direction into the special starting position $O_1$, the tail 188¹ strikes against the left hand projection of the segment 208, so that when the sign changing key is used the circuit is not closed until the arm 184 commences being carried around by the coupling disk 182. By finding the buffer 184¹ that knocks against the stops on a hinge and by giving this buffer a slanting bottom surface at its free end, the arm 184 is enabled to pass the ordinary stop 205 whenever it starts moving from its special starting position $O_1$ and the stop 205 has been allowed to rise before the arm 184 has passed it. In such cases the buffer 184¹ is flipped upward on its hinge when it reaches the stop 205 and moves over it without the progress of the arm 184 being arrested.

The transmitter shown in Figs. 20 to 23 works on the same principle as the transmitter described above, differing only in the arrangement of its part. The parts in this modification which correspond with parts described above are furnished with similar signs of reference. The principal difference consists in the catches 198 attached to the key levers 195 pivoted in the axis 211 being arranged in a straight row. These catches fit loosely in notches cut into a straight holding bar 212 which is fixed to support 213 which also serve as guides for a sliding rack 214 having teeth (not shown in the drawing) on its left side. Attached to the sliding rack 214 is a stop 215 which limits the motion of the sliding rack by striking against the support 213. The closing of the circuit in transmitting a message is done with the aid of a contact spring 216 attached to the rack 214 this spring being arranged to make contact with a contact strip 220 which is insulatingly fixed to a rockable contact making device consisting of the shaft 217, the arms 218 and a slanting cross bar 219, this contact making device being normally kept away from the contact spring 216 by retractile spring 221. The vertical shaft 222 is pivoted in the base plate 223 and in the arc-shaped support 224 and carries a rigidly fixed worm wheel 225 (Fig. 20). The worm wheel is rotated by the shaft 226 which is turned by a rotary converter or equivalent machine not shown in the drawing. The shaft 222 in turning carries the coupling disk 227 around with it by virtue of a pin 228 that projects into a slot in the hub of the disk. The disk can move vertically on the shaft 222 the extent of its vertical movement being determined by the length of the slot surrounding the pin 228. A sleeve 229 which is rigidly fixed to a disk 230 fits loosely on the shaft 222. The disk 230 has four fixed teeth 230¹ and a semi-circular slot 230² into which a pin 236 protrudes which is fixed to a toothed wheel 231 located beneath the disk 230. A spring 232 whose one end is attached to the pin 233 tends to turn the disk 230 in the opposite direction to that indicated by the arrows in Figs. 21 and 22. The coupling disk 227 is normally held in its represented raised position by a spring 235. The disk 230 and the toothed wheel 231 are normally coupled to each other by a bolt 236 that extends through the toothed wheel and into the disk 230.

On a key e. g. $\frac{z}{3}$ being depressed the catch 198 belonging to it hooks itself onto the holding bar 212 which now holds the key down. In its downward movement it presses down the bow 192 and this in turn depresses the constantly revolving coupling disk 227 causing it to engage with one of the teeth of the disk 230 and to set this disk in motion. The pin 236 carries the toothed wheel 231 around also, so that the rack 240 that meshes with the toothed wheel is moved and continues moving until the stop 215 strikes the catch 198 of the depressed key lever. The motion of the rack is accompanied with the sliding of the contact spring 216 against the contact bar 220 and the consequent closure of the transmitted circuit because when a key is depressed it acts on the slanting cross bar 219 and pushes the frame carrying the contact bar over into the position indicated in Fig. 20 by dash and dot lines. When the stop 215 strikes the catch 198 it is pushed back against the action of its spring 200. The depressed lever is then released from the holding bar 212 and the spring 235 lifts the clutch disk 227 together with the bow 192 and the released key into their normal position. On being lifted the clutch disk 227 becomes disengaged from the disk 230 and this disk 230 together with the toothed wheel 231 and the rack 214 are returned into their normal positions by the spring 232. The depressed key in rising allows the contact bar 220 to be pulled away from the contact spring 216 by the spring 221. The same action takes place on the depression of any key including the line space key 203 and the word space key 204 but excluding the sign changing key 202.

By means of the sign changing key 202 a determined and always equal number of alterations is sent over the line or lines before the rack 214 is moved out of its normal position. To accomplish this an angular striker 237 is attached by the lever of the key 202 which, on the key being depressed, strikes against the horizontal part of the bolt 238 and pushes this bolt (which is normally held up by a flat spring) down causing the upper part of the bolt to sink down out of the plane of the disk 230 thus uncoupling the disk from the toothed wheel and allowing the spring 232 to turn the disk 230 in a clockwise direction until the left end of the semi-circular slot 230², Fig. 21, strikes against the pin 236 as shown in Fig. 22 the movement of the pin 236 and the toothed wheel 231 being prevented by the stop 215 of the rack 214 with which the toothed wheel meshes butting against the rack guide 213. At one side of the disk 230 there is a pivoted angular circuit closer 240 with a hinged finger 241 which yields to pressure from its left side but not from its right, so that when the disk 230 rushes against it in turning in a clockwise direction, which happens when the sign changing key is depressed, the circuit closer 240 remains in its normal position. The position of the disk 230 and of the circuit closer 240 after the depression of the sign changing key is shown in Fig. 22. If an ordinary key e. g. $\frac{z}{3}$ is now pressed down and the disk 230 is thereby caused to rotate in a counter-clockwise direction through its being coupled to the coupling disk 227 the circuit closer 240 will be forced into contact with the contact spring 242 as indicated by dash and dot lines in Fig. 21. The circuit closer will be kept in this position until the disk 230 has been turned to such an extent that the left end of the slot $230^2$ Fig. 22 has reached the pin 236 of the toothed wheel 231 when the finger 241 of the circuit closer will assume the position shown in Fig. 21 and the disk 230 will commence carrying the toothed wheel 231 around with it and causing the rack 214 to move. From the moment the rack 214 commences to move the transmitting circuit is closed in the usual manner by the contact spring 216 brushing against the contact bar 220 the contact previously existing between the circuit closer 240 and the contact spring 242 being broken. By the depression of the sign changing key a number of alternations in addition to the number sent when depressing the key $\frac{z}{3}$ by itself will have been sent over the lines this additional number corresponding to angular movement determined by the length of the slot $230^2$. This will have caused the typewheel of the receiver to turn the figure 3 into the printing position instead of the letter z.

I claim—

1. In a system of electrically transmitting and recording signs, the combination with a transmitter adapted to produce electrical current impulses, and a receiving instrument, of recording means in said receiving instrument, comprising a sign-setting mechanism and other mechanisms for completing the recording operation an electromagnet electrically connected with said transmitter, an armature controlled by said electromagnet and adapted to operate the sign-setting mechanism, and a second armature controlled by said electromagnet and adapted to operate the completing mechanisms upon the cessation of the current impulses from the transmitter.

2. In a system of electrically recording signs, the combination with a device adapted to produce electrical current impulses, and a receiving instrument, of recording means in said receiving instrument, an electromagnet electrically connected with said device, an armature operated by said electromagnet and adapted to control one part of the recording operation of said recording means, and a second armature controlled by said electromagnet and operative upon the cessation of the current impulses from the transmitter and adapted to control another part of the recording operation.

3. In a system of electrically transmitting and recording signs, the combination with a transmitter adapted to produce electrical current impulses, and a receiving instrument, of recording means in said receiving instrument, an electromagnet electrically connected with said transmitter, setting means for setting the recording means into a preparatory recording position, a rapidly responsive armature controlled by the said electromagnet and adapted to control the said setting means, shifting means for moving the recording means into an ultimate recording position and a slowly responsive armature controlled by the said electromagnet and adapted to actuate the said shifting means upon the cessation of the current impulses from the transmitter.

4. In a system of electrically recording signs, the combination with a transmitter adapted to produce electrical alternating current impulses, and a receiving instrument, of recording means in said receiving instrument, an electromagnet electrically connected with said transmitter, setting means for setting the recording means into a preparatory recording position, an armature controlled by the said electromagnet, said armature controlling the said setting means, shifting means for moving the recording means into an ultimate recording position and a second armature controlled by the said electromagnet and adapted to actuate the said shifting means upon the cessation of the current impulses from the transmitter.

5. In a system of electrically recording signs, the combination with a transmitter adapted to produce electrical alternating current impulses, and a receiving instrument, of recording means in said receiving instrument, an electromagnet electrically connected with said transmitter, setting means for setting the recording means into a preparatory recording position, a polarized armature controlled by the said electromagnet, said polarized armature controlling the said setting means, shifting means for moving the recording means into an ultimate recording position, and an unpolarized armature for controlling the said shifting means, the unpolarized armature being controlled by the said electromagnet and actuating the shifting means upon the cessation of the current impulses from the transmitter.

6. In a system of electrically recording signs, the combination with a transmitter adapted to produce electrical alternating current impulses, and a receiving instrument, of recording means in said receiving instrument, an electromagnet electrically connected with said transmitter, setting means for setting the recording means into a preparatory recording position, a polarized rapidly responsive armature controlled by the said electromagnet and adapted to control the said setting means, shifting means for moving the recording means into an ultimate recording position and a second unpolarized armature controlled by the said electromagnet, said unpolarized armature being operative upon the cessation of the current impulses and adapted to control the said shifting means.

7. In a system of electrically recording signs, the combination with a transmitter adapted to produce electrical current impulses and a receiving instrument, of recording means in said receiving instrument comprising a sign-setting mechanism and other mechanisms for completing the recording operation, an electromagnet connected with said transmitter, an armature controlled by said electromagnet and adapted to operate the sign-setting mechanism, and a second armature controlled by said electromagnet and adapted to operate the completing mechanisms.

8. In a system of electrically recording signs, the combination with a transmitter adapted to produce electrical current impulses, and a receiving instrument, of sign-setting means in said receiving instrument, mechanism coöperating with said setting means, a local source of energy adapted to operate said setting means, a local source of energy adapted to operate said mechanism coöperating with the setting means, electrical means adapted to be controlled by the impulses from said transmitter, two separate means controlled by said electrical means and each adapted to control the operation of one of said local sources of energy.

9. In a system of electrically recording signs, the combination with a transmitter adapted to produce electrical current impulses, and a receiving instrument, of recording means in said receiving instrument, one means adapted to prepare the recording operation of said recording means, a local source of energy for actuating the said preparing means, means adapted to complete the recording operation, a local source of energy for actuating the said completing means, an electrical device adapted to be operated by impulses from the transmitter, separate means operated by said electrical means each adapted to control the operation of one of said local sources of energy.

10. In a system of electrically recording signs, the combination with a transmitter adapted to produce electrical current impulses, and a receiving instrument, of recording means in said receiving instrument, an electromagnet electrically connected with said transmitter, setting means for setting the recording means into a preparatory recording position, an armature controlled by the said electromagnet and adapted to control the said setting means, shifting means for moving the recording means into an ultimate recording position, a second armature controlled by the said electromagnet and adapted to control the shifting means and automatic means operative at the end of the recording operation to reset said recording means to the normal position.

11. In a system of electrically recording signs, the combination with a transmitter adapted to produce electrical current impulses, and a receiving instrument, of recording means in said receiving instrument, an electromagnet electrically connected with said transmitter, setting means for setting the recording means into a preparatory recording position, an armature controlled by the said electromagnet and adapted to control the said setting means, shifting means for moving the recording means into an ultimate recording position, a second armature controlled by the said electromagnet and adapted to control the said shifting means, a spring connected with the said recording means and having the tendency to reset the same, and automatic means operative at the end of the recording operation to break connection between the said recording means and the said setting means.

12. In a system of electrically recording signs, the combination with a transmitter adapted to produce electrical current impulses, and a receiving instrument, of recording means in said receiving instrument, an electromagnet electrically connected with said transmitter, an armature controlled by said electromagnet and adapted to prepare the recording operation of said recording means, a second armature controlled by said electromagnet and adapted to complete the recording operation, automatic means operative at the end of the recording operation to shift said recording means laterally and in the direction of the printing line.

13. In a system of electrically recording signs, the combination with a transmitter adapted to produce electrical current impulses, and a receiving instrument, of recording means in said receiving instrument, a platen, an electrical device connected with said transmitter, means controlled by said electrical device to set said recording means in recording position, means separate from said setting means and controlled by said electrical device to move said platen and recording device in contact with each other, means to separate the platen and recording means, and means operated by the separating means to shift the recording means laterally and in the direction of the printing line.

14. In a system of electrically recording signs, the combination with a transmitter adapted to produce electrical current impulses, and a receiving instrument, of recording means in said receiving instrument, a platen, an electrical device connected with said transmitter, means controlled by said electrical device to set said recording means in recording position, means separate from said setting means and controlled by said electrical device to move said platen and recording device in contact with each other, means to separate the platen and recording means, and means operated by the separating means to shift the recording means laterally and in the direction of the printing line and to reset said recording means.

15. In a system of electrically recording signs, the combination with a transmitter adapted to produce electrical current impulses, and a receiving instrument, of recording means in said receiving instrument, a platen, an electromagnet electrically connected with said transmitter, an armature controlled by said electromagnet, means controlled by the said armature for setting the recording means into recording position, a second armature controlled by the said electromagnet, means controlled by the second armature for moving the said platen and recording device in contact with each other, means to separate the platen and recording means, and means operated by the separating means to shift the recording means laterally and in the direction of the printing line and to reset said recording means.

16. In a system of electrically recording signs, the combination with a transmitter adapted to produce electrical current impulses, of a rotary and laterally shiftable type wheel, an electromagnet electrically connected with said transmitter, means for rotating said type wheel, an armature for controlling the said rotating means, said armature being controlled by the said electromagnet, means for laterally shifting the said type wheel, and a second armature for controlling the said shifting means, said second armature being controlled by the said electromagnet.

17. In a system of electrically recording signs, the combination with a transmitter adapted to produce electrical current impulses, and a receiving instrument, of a rotary shaft, a type wheel longitudinally shiftable thereon and having types arranged about its circumference, an escapement device on said shaft adapted to cause the rotation of the type-wheel on the shaft, an electromagnet electrically connected with said transmitter, means for rotating the said type wheel, an armature controlled by said electromagnet to control said rotating means, a second armature controlled by said electromagnet to operate said escapement device, and means operated by said escapement device to reset said type wheel.

18. In a system of electrically recording signs, the combination with a transmitter adapted to produce electrical current impulses, and a receiving instrument, of a rotary shaft, a type wheel longitudinally shiftable thereon and having types arranged about its circumference, a toothed rack on said shaft having stepwise longitudinal movement thereon and adapted to impart stepwise shifting movement to said type wheel, automatic means tending to reset the type wheel, an electric device operatively connected with said transmitter means controlled by the said electric device and adapted to rotate said shaft and type wheel in opposition to said automatic resetting means, means controlled by said electric device which are adapted to impart shifting movement to said rack, and means operated by said rack upon its shifting movement to disconnect said type wheel shaft from the said shaft rotating means and to throw said resetting means into operation.

19. In a system of electrically recording signs, the combination with a transmitter adapted to produce electrical current impulses, and a receiving instrument, of recording means in said receiving instrument, a platen, an electromagnet electrically connected with said transmitter, a rapidly responsive armature controlled by said electromagnet, means controlled by the said armature and adapted to set said recording means in recording position, a sluggish armature connected with said electromagnet and means controlled by the said sluggish armature and adapted to throw said platen against the recording means upon the cessation of the current impulses.

20. In a system of electrically recording signs, the combination with a transmitter adapted to produce electrical current impulses, and a receiving instrument, of a type wheel, means to rotate said type wheel, a platen, means to move said platen in contact with said type wheel, means to retract the platen from the type wheel an electromagnet electrically connected with said transmitter, a rapidly responsive armature for actuating the said type wheel rotating means, said rapidly responsive armature being controlled by the said electromagnet, a sluggish armature controlled by said electromagnet means controlled by the said armature and adapted upon the cessation of the current impulses to operate said means for moving the platen in contact with the type wheel.

21. In a system of electrically recording signs, the combination with a transmitter adapted to produce electrical current impulses, and a receiving instrument, of a type wheel, a platen, means to retract the platen from the type wheel, means connected with said retracting means to reset said type wheel an electromagnet electrically connected with said transmitter, a rapidly responsive armature controlled by said electromagnet and adapted to rotate said type wheel in printing position, a sluggish armature controlled by said electromagnet means controlled by the said armature and adapted upon the cessation of the current impulses to operate said means for moving the platen in contact with the type wheel.

22. In a system of electrically recording signs, the combination with a transmitter adapted to produce electrical current impulses, and a receiving instrument, of a type wheel having types arranged about its circumference, a platen, means to move said platen in contact with said type wheel, means to retract the platen from the type wheel, means connected with said retracting means to reset said type wheel and to impart stepwise lateral movement thereto, an electromagnet electrically connected with said transmitter, a rapidly responsive armature controlled by said electromagnet means controlled by the said armature and adapted to rotate said type wheel in printing position, a sluggish armature controlled by said electromagnet and adapted upon the cessation of the current impulses to operate said means for moving the platen in contact with the type wheel.

23. In a system of electrically recording signs, the combination with a transmitter adapted to produce electrical current impulses, and a receiving instrument, of a type wheel having types arranged about its circumference, means to impart stepwise lateral movement to said type wheel, shifting means operative after rotating the type wheel at a determined angle to return said type wheel laterally into initial position and in a direction opposite to the stepwise lateral movement, an electromagnet, a rapidly responsive armature coöperating with said electromagnet means controlled by the said armature and adapted to rotate said type wheel, a sluggish armature coöperating with the electromagnet and adapted to operate said type wheel shifting means.

24. In a system of electrically recording signs, the combination with a transmitter adapted to produce electrical current impulses, and a receiving instrument, of a type wheel having types arranged about its circumference, means to impart stepwise lateral movement to said type wheel, shifting means operative after rotating the type wheel at a determined angle which is the smallest angle of rotation of the type wheel caused by the current impulses from the transmitter to return said type wheel laterally into initial position and in a direction opposite to the stepwise lateral movement, an electromagnet, a rapidly responsive armature coöperating with said electromagnet means controlled by the said armature and adapted to rotate said type wheel, a sluggish armature coöperating with the electromagnet and adapted to operate said type wheel shifting means.

25. In a system of electrically recording signs, the combination with a transmitter adapted to produce electrical current impulses, and a receiving instrument, of a type wheel, means to impart stepwise lateral movement thereto, means to lock said type wheel in position when shifted laterally, means tending to return the type wheel into initial lateral position, means to release said locking means, means operative after rotating the type wheel at a determined angle to control said releasing means, electrical means connected with said transmitter and means operated by said electrical means to rotate the type wheel.

26. In a system of electrically recording signs, the combination with a transmitter adapted to produce electrical current impulses, and a receiving instrument, of a rotary shaft, a type wheel longitudinally shiftable thereon and having types arranged about its circumference, a shifting device connected with the said shaft and having a type wheel actuating and a type wheel releasing position and adapted to impart lateral shifting movement to the type wheel on the shaft, an electrically operated device connected with said transmitter, means controlled by said electrically operated device and separate from said rotating means to operate said shifting device into its releasing position, means operative when rotating the type wheel at a determined angle to prepare the operation of said means to throw the shifting device into the releasing position, and means controlled by said separate electrical means to complete the operation of said means to throw the shifting device into its releasing position.

27. In a system of electrically recording signs, the combination with a transmitter adapted to produce electrical current impulses, and a receiving instrument, of a rotary shaft, a type wheel longitudinally shiftable thereon and having types arranged about its circumference, a shifting device in connection with the said shaft for imparting shifting movement of the type wheel on the shaft and having an actuating and a releasing position, a platen, an electrical device connected with the said transmitter, means controlled by said electrical device to rotate said shaft, means controlled by said electrical device and separate from said rotating means to operate said shifting device and to move said platen toward the type wheel, means tending to retract said type wheel laterally into its initial position, means for throwing said shifting device into its releasing position, means operative when rotating the type wheel at a determined angle to prepare the operation of said means for throwing the shifting device into its releasing position and means operated by said platen moving means to complete the operation of said means for throwing the shifting device into its releasing position.

28. In a system of electrically recording signs, the combination with a transmitter adapted to produce electrical current impulses, and a receiving instrument, of recording means in said receiving instrument, a platen coöperating with said recording means, paper feeding devices, an escapement device to impart intermittent lateral movement to said recording means, means to return said recording means into initial lateral position, means operated by the recording means upon its return in initial position to operate the paper feeding devices, an electrically operated device connected with said transmitter, means controlled by said electrically operated device to prepare the recording operation of the recording means, and means separate from said preparing means to operate said escapement device for imparting stepwise movement to said recording means.

29. In a system of electrically recording signs, the combination with a transmitter adapted to produce electrical alternating current impulses, and a receiving instrument, of recording means in said receiving instrument, an electromagnet electrically connected with said transmitter, a rapidly responsive armature operated by said electromagnet and adapted to control one part of the recording operation of said recording means, a second sluggish armature controlled by said electro-magnet and adapted to control another part of the recording operation, and means operative at the end of the recording operation to set said rapidly responsive armature in its initial position.

30. In a system of electrically recording signs, the combination with a transmitter adapted to produce electrical alternating current impulses, and a receiving instrument, of recording means in said receiving instrument, an electromagnet electrically connected with said transmitter, a polarized armature controlled by said electromagnet, means controlled by the polarized armature and adapted to prepare the recording operation of said recording means, an unpolarized armature controlled by said electromagnet means controlled by the unpolarized armature and adapted to complete the recording operation, means to return said recording means into initial position, and means controlled by said returning means to set said polarized armature in its initial position.

31. In a system of electrically recording signs, the combination with a transmitter, adapted to produce electrical current impulses, and a receiving instrument, of a rotary and laterally shiftable type wheel, having types arranged about its circumference, an electromagnet connected with said transmitter, a polarized armature controlled by said electromagnet, means controlled by the said armature and adapted to rotate said type wheel, an unpolarized sluggish armature controlled by said electromagnet adapted to complete the recording operation, means to return said type wheel into initial position, and means operated by said returning means to set said polarized armature into initial position.

32. In a system of electrically recording signs, the combination with a transmitter adapted to produce electrical current impulses, and a receiving instrument, of recording means in said receiving instrument, ribbon mechanism, a ribbon guide normally holding the ribbon away from said recording means, an electromagnet electrically connected with said transmitter, an armature controlled by said electromagnet, means controlled by the said armature and adapted to prepare the recording operation of said recording means, a second armature controlled by said electromagnet, means controlled by the said second armature and adapted to complete the recording operation, and means connected with said second armature to shift the ribbon guide with the ribbon into operative position relatively to the recording means.

33. In a system of electrically recording signs, the combination with a transmitter adapted to produce electrical current impulses, and a receiving instrument, of recording means in said receiving instrument, ribbon mechanism comprising two spools and ratchet wheels, a rocking ratchet lever common to both ratchet wheels, means adapted when the ribbon is unwound to throw said ratchet lever into position for engagement with the ratchet wheel of the unwound spool, means for operating said ratchet lever, an electromagnet electrically connected with said transmitter, an armature controlled by said electromagnet, means controlled by the said armature and adapted to prepare the recording operation of said recording means, and a second armature controlled by said electromagnet, means controlled by the said second armature and adapted to complete the recording operation.

34. In a system of electrically recording signs, the combination with a transmitter adapted to produce electrical current impulses, and a receiving instrument, of recording means in said receiving instrument, ribbon mechanism comprising two spools and ratchet wheels, a rocking ratchet lever common to both ratchet wheels clasps one for each of the spools and adapted to have the ribbon attached thereto and to be brought when the ribbon is unwound into position to throw said ratchet lever into position for engagement with the ratchet wheel of the unwound spool, means for operating said ratchet lever, an electromagnet electrically connected with said transmitter, an armature controlled by said electromagnet, means controlled by the said armature and adapted to prepare the recording operation of said recording means, and a second armature controlled by said electromagnet, means controlled by the said second armature and adapted to complete the recording operation.

35. In a system of electrically recording signs, the combination with a transmitter adapted to produce electrical current impulses, and a receiving instrument, of a type wheel, a platen, electrical means to shift said type wheel laterally, means to return said type wheel laterally into initial position, ribbon mechanism and means controlled by the type wheel upon its return in initial position to operate the ribbon mechanism.

36. In a system of electrically recording signs, the combination with a transmitter adapted to produce electrical current impulses, and a receiving instrument, of a type wheel, a platen, electrical means to shift said type wheel laterally, means to return said type wheel laterally into initial position, ribbon mechanism comprising two spools and ratchet wheels, a rocking ratchet lever, means controlled by the ribbon to alternately throw said ratchet lever into engagement with either one of said ratchet wheels, and means controlled by the type wheel upon its return in initial position to operate the ratchet lever.

37. In a system of electrically recording signs, the combination with a transmitter adapted to produce electrical current impulses, and a receiving instrument, of recording means in said receiving instrument, a setting electromagnet electrically connected with said transmitter, an armature for setting the said recording means in a preparatory recording position, said armature being controlled by the said setting electromagnet, shifting means for moving the recording means into the ultimate recording position, a local source of energy for actuating the said shifting means and a second armature controlled by the said electromagnet and for controlling the said local source.

38. In a system of electrically recording signs, the combination with a transmitter adapted to produce electrical current impulses, and a receiving instrument, of recording means in said receiving instrument, a setting electromagnet electrically connected with said transmitter, an armature for setting the said recording means into a preparatory recording position, said armature being controlled by the said setting electromagnet, a shifting magnet for shifting the recording means into the ultimate recording position, a local source of electric energy for energizing the said shifting magnet, a switch for controlling the said local source of electric energy, and a second armature controlled by the said setting electromagnet and for controlling the said local source.

39. In a system of electrically recording signs, the combination with a transmitter adapted to produce electrical current impulses, and a receiving instrument, of recording means in said receiving instrument, a setting electromagnet electrically connected with said transmitter, an armature for setting the said recording means into a preparatory recording position, said armature being controlled by the setting electromagnet, a shifting magnet for moving the recording means into the ultimate recording position, a local source of electric energy for energizing the said shifting electromagnet, a switch controlling the said local source of electric energy and comprising a stationary terminal, a rocking member, a movable terminal adapted to be engaged by said rocking member and to be electrically connected with said stationary terminal, a spring operative after connection has been made between said terminals to retract said movable terminal from the stationary terminal, and a second armature controlled by said setting electromagnet and adapted to operate by said rocking member.

40. In a system of electrically recording signs, the combination with a transmitter adapted to produce electrical current impulses, and a receiving instrument, of recording means in said receiving instrument, a setting electromagnet electrically connected with said transmitter, an armature for setting said recording means into a preparatory recording position, said armature being controlled by the setting electromagnet, electrical shifting means for moving the said recording means into an ultimate recording position, a local source of electric energy for actuating said shifting means, a switch controlling said local source of electric energy, said switch comprising two terminals, means adapted to engage one of said terminals and to move the same in contact with the other terminal, automatic means operative when said terminals have made contact to retract said movable contact, and a second armature controlled by the setting electromagnet and adapted to operate said means for moving the terminal.

41. In a system of electrically recording signs, the combination with a transmitter adapted to produce electrical current impulses, and a receiving instrument, of recording means in said receiving instrument, preparatory means for setting the said recording means into a preparatory recording position, a motor in said receiver for actuating the said preparatory means, a local source of energy adapted to store energy in said motor, an electromagnet electrically connected with said transmitter, an armature controlled by said electromagnet and adapted to throw said motor into setting operation, and a second armature operative after the armature which controls the motor and adapted to throw said local source of energy into operation for storing energy in said motor.

42. In a system of electrically recording signs, the combination with a transmitter adapted to produce electrical current impulses, and a receiving instrument, of recording means in said receiving instrument, a local source of energy, a motor, means to prepare the recording operation of said recording means, means to complete the recording operation, an electromagnet electrically connected with said transmitter, an armature controlled by said electromagnet and adapted to operatively connect said motor with said preparing means, and a second armature operative after the preparing armature to operatively connect said local source of energy with said completing means.

43. In a system of electrically recording signs, the combination with a device adapted to produce electrical current impulses, and a receiving instrument, of recording means in said receiving instrument, an electromagnetically operated member adapted to control one part of the recording operation of said recording means, a second electromagnetically operated member, said electromagnetically operated members being adapted to be actuated by the same current impulses, means to return said second electromagnetically operated member into initial position, and mechanism connected with said second electromagnetically operated member and temporarily operative during the return stroke thereof to control the second part of the recording operation of the recording means.

In testimony whereof I affix my signature in presence of two witnesses.

P. ETIENNE.

Witnesses:
S. JUNOD,
P. GRANDSON.